(12) United States Patent
Mashiko

(10) Patent No.: US 6,542,344 B1
(45) Date of Patent: Apr. 1, 2003

(54) SWITCHING REGULATOR

(75) Inventor: Takeshi Mashiko, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/559,375

(22) Filed: Apr. 27, 2000

(30) Foreign Application Priority Data

May 10, 1999 (JP) ............................................ 10-128973

(51) Int. Cl.[7] .............................. H02M 5/42; H02H 3/00
(52) U.S. Cl. ........................... 361/93.9; 361/18; 363/89; 323/908
(58) Field of Search ...................... 361/93.9, 98, 18; 307/125, 131, 110, 66; 323/282, 908, 266; 363/84, 89

(56) References Cited

U.S. PATENT DOCUMENTS

| 5,350,997 A | * | 9/1994 | Ghotbi et al. ................ 323/268 |
| 5,420,780 A | * | 5/1995 | Bernstein et al. ............. 363/89 |
| 5,834,924 A | * | 11/1998 | Konopka et al. ........... 323/222 |
| 6,094,036 A | * | 7/2000 | Rampold .................... 323/266 |

* cited by examiner

Primary Examiner—Kim Huynh
(74) Attorney, Agent, or Firm—Adams & Wilks

(57) ABSTRACT

A switching regulator includes an input power supply connected to an input of the switching regulator; at least one input/output disconnection switch disposed between the input power supply and a device connected to an output of the switching regulator, for interrupting the supply of an energy to the device from the input power supply; and a device for limiting a rush current that flows into an output capacitor from the input power supply when the input/output disconnection switch turns on to start step-up operation.

11 Claims, 4 Drawing Sheets

US 6,542,344 B1

SWITCHING REGULATOR

BACKGROUND OF THE INVENTION

1. Field of the Invention

The present invention relates to a switching regulator that is capable of reducing a rush current that flows at the time of starting.

2. Description of the Related Art

In general, a chopper type step-up switching regulator is mainly made up of, as shown in a circuit diagram of FIG. 4, an inductor 403, a rectifying device 404, a smoothing capacitor 405, a switching device 407 and a control circuit 406. In the switching regulator thus structured, even if the switching device 407 is turned off to stop the step-up operation, an energy is unavoidably supplied to a load device 402 from an input power supply 401 through the inductor 403 and the rectifying device 404.

Under the above circumstances, there has been conventionally known, as shown in FIG. 3, a switching regulator in which a switch 310 is disposed between an input power supply 301 and an inductor 303, a switch 311 is disposed between the inductor 303 and a switching device 307, a switch 312 is disposed between the switching device 307 and a rectifying device 304, a switch 313 is disposed between the rectifying device 304 and a smoothing capacitor 305, and a switch 314 is disposed between a smoothing capacitor 305 and a device 302, wherein those respective switches are turned off in order to interrupt the supply of an energy to the device 302 from the input power supply 301 when step-up operation stops.

However, in the conventional switching regulator, when the switch 310, the switch 311, the switch 312, the switch 313 or the switch 314 are turned on to start the step-up operation, a large rush current unavoidably flows into the smoothing capacitor 305 and a capacitor 309 added to the device from the input power supply 301 with an adverse effect that an input supply voltage drops or the rectifying device, the smoothing capacitor and so on are damaged by the rush current.

SUMMARY OF THE INVENTION

In view of the above, an object of the present invention is to solve the above problems with the conventional switching regulator.

Another object of the present invention is to provide a switching regulator which is capable of suppressing a rush current in which a switch for interrupting the supply of an energy to a device from an input power supply is not suddenly changed over from an inconductive state to a conductive state to permit a current to flow infinitely as soon as the switch turns on as in the conventional switching regulator, but a switch that limits a current or a switch that limits a current which flows for a given period of time, is employed.

In order to achieve the above objects, according to the present invention, there is provided a switching regulator, comprising:

an input power supply connected to an input of the switching regulator;

at least one input/output disconnection switch disposed between the input power supply and a device connected to an output of the switching regulator, for interrupting the supply of an energy to the device from the input power supply; and means for limiting a rush current that flows into an output capacitor from the input power supply when the input/output disconnection switch turns on to start step-up operation.

Also, according to the present invention, in the switching regulator, the rush current limiting means of the input/output disconnection switch has a current limit function added to the output disconnection switch to set a limit value of a current that is allowed to flow.

Further, according to the present invention, in the switching regulator, the rush current limiting means of the input/output disconnection switch has a transistor as the output disconnection switch, the transistor operating in the same manner as that of an integral amplifying circuit to limit a current that flows for a given period of time.

Still further, according to the present invention, in the switching regulator, the rush current limiting means of the input/output disconnection switch repeats the on/off operation of the output disconnection switch to control an on-time and off-time, thereby limiting a current that is allowed to flow.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
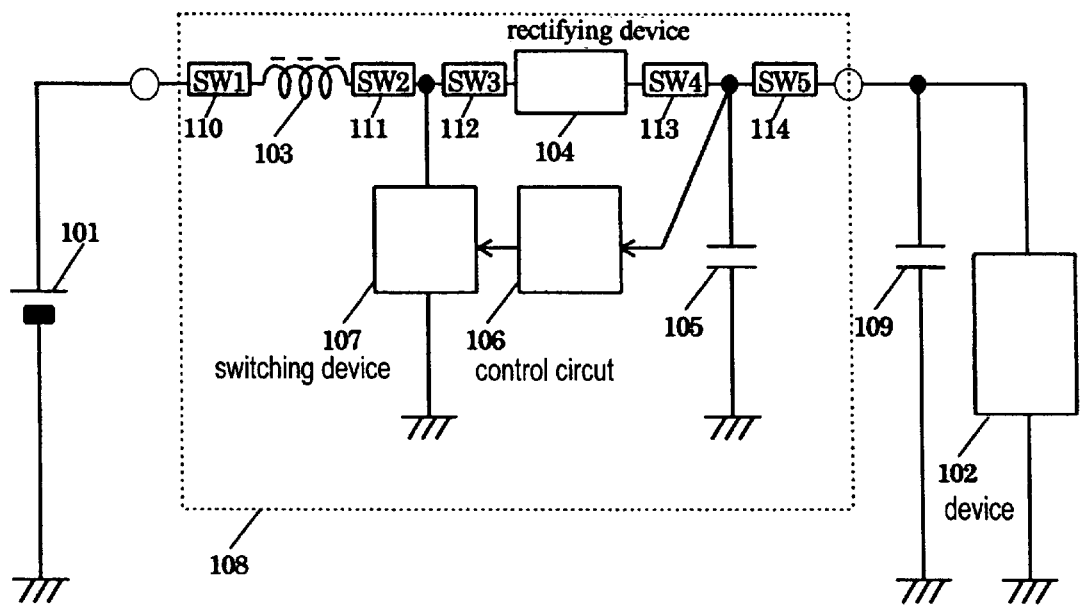
FIG. 1 is a diagram showing the entire circuit of a chopper type step-up switching regulator with an input/output disconnection switch in accordance with a first embodiment of the present invention.

FIG. 1 is a diagram showing a chopper type step-up switching regulator in accordance with a first embodiment of the present invention. In the circuit, an inductor 103, a rectifying device 104, a smoothing capacitor 105, a switching device 107 and a control circuit 106 are identical with those in the conventional switching regulator. A switch that limits a current is employed as one of a switch 110, a switch 111, a switch 112, a switch 113 and a switch 114 which are disposed between an input power supply 101 and a device 102. This structure can limit a rush current flowing from the input power supply 101 to the smoothing capacitor 105 and a capacitor 109 added to the device 102 since the stop of step-up operation when the switch disposed between the input power supply 101 and the device 102 turns off until the start of the step-up operation when the switch turns on.

Figure 2:
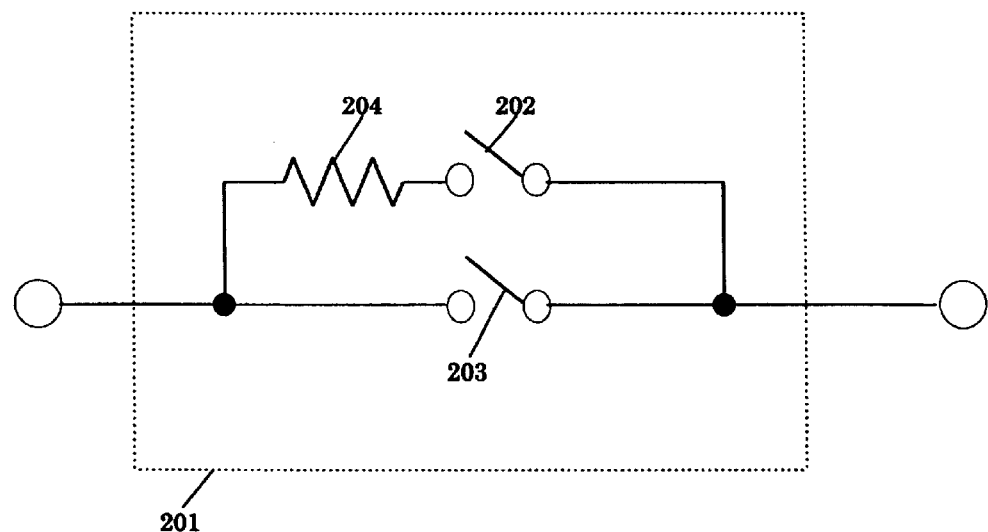
FIG. 2 is a diagram showing a specific circuit example 1 of an input/output disconnection switch portion in accordance with the first embodiment of the present invention.
Figure 3:
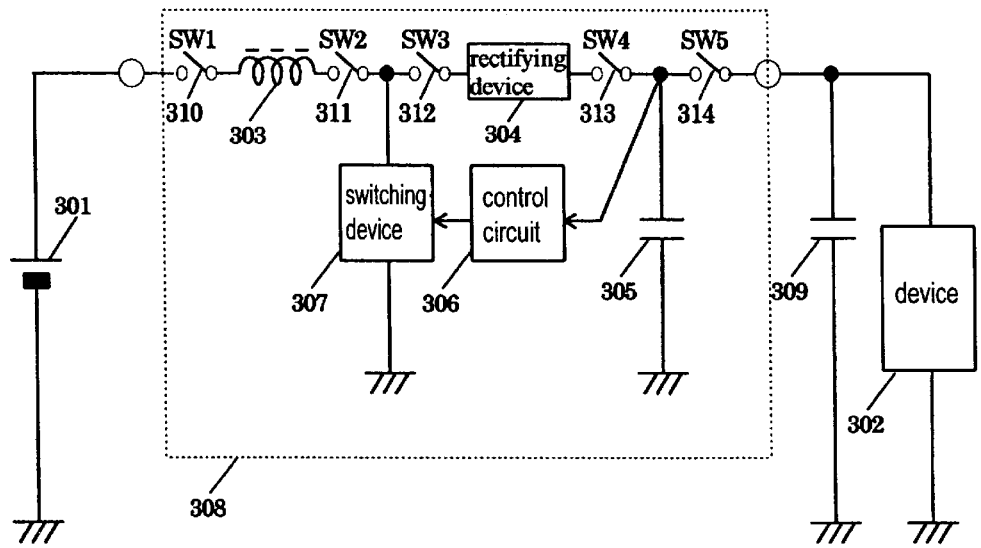
FIG. 3 is a diagram showing the entire circuit of a conventional chopper type step-up switching regulator with an input/output disconnection switch.
Figure 4:
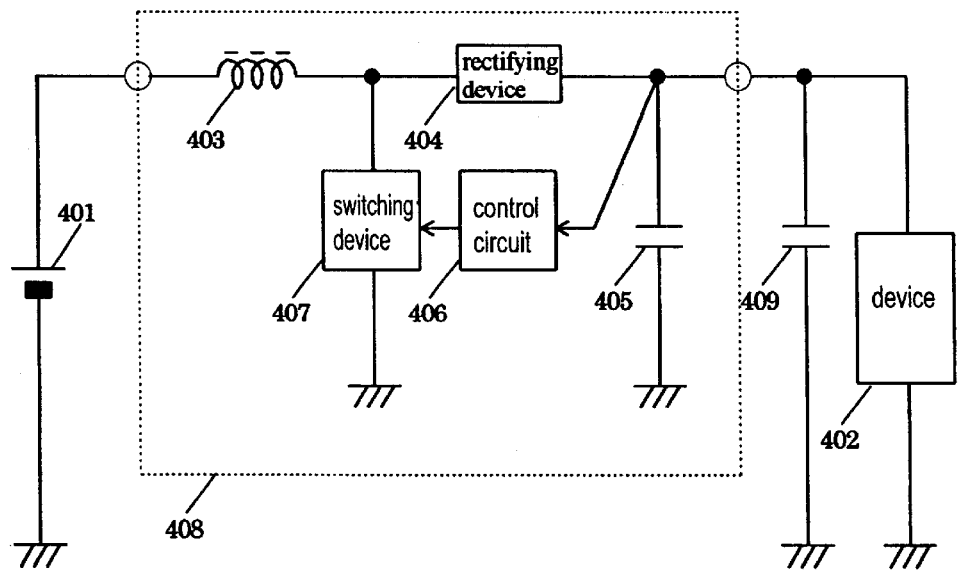
FIG. 4 is a diagram showing the entire circuit of a conventional chopper type step-up switching regulator.

FIG. 2 shows a specific example of the switch that limits a current. The switch is made up of a current limit resistor 204, a switch 202 and a switch 203. At the time of starting step-up operation, the switch 202 first turns on, the smoothing capacitor 105 and the capacitor 109 added to the device are charged by the input power supply 101 through the current limit resistor 204, and the switch 203 is turned on after the charging operation is completed. In this situation, assuming that an input supply voltage is VIN and a current limit resistance is R, the maximum charge current Icharge which flows in the capacitor 105 and the capacitor 109 is represented by the following expression:

$$Icharge=VIN/R \qquad (1)$$

Thus, the current limit is realized by setting the current limit resistor R to such a current limit resistance as to produce a charge current without any problems.

Figure 5:
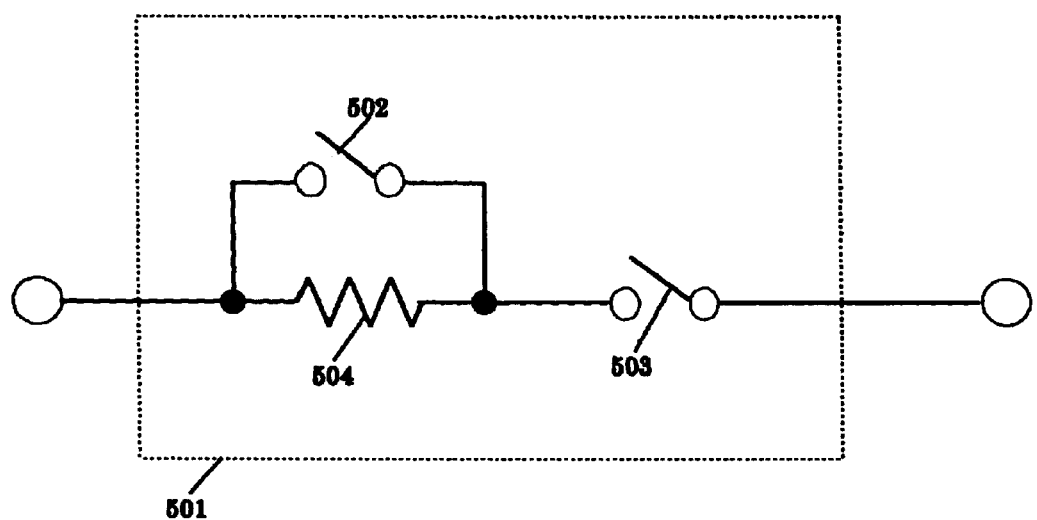
FIG. 5 is a diagram showing a specific circuit example 2 of an input/output disconnection switch portion in accordance with the first embodiment of the present invention.

Similarly, in an example of a switch shown in FIG. 5, the current limit can be realized in such a manner that a switch 503 first turns on and a switch 502 turns on after the charging operation.

It is apparent that the current limit resistor can be replaced by another element that limits a current and the same effect can be obtained if the switch is formed of a transistor that is an electronic switch device. Also, it is apparent that the same effect is obtained without using the current limit resistor if a switch that limits a current is employed.

Second Embodiment

Figure 6:
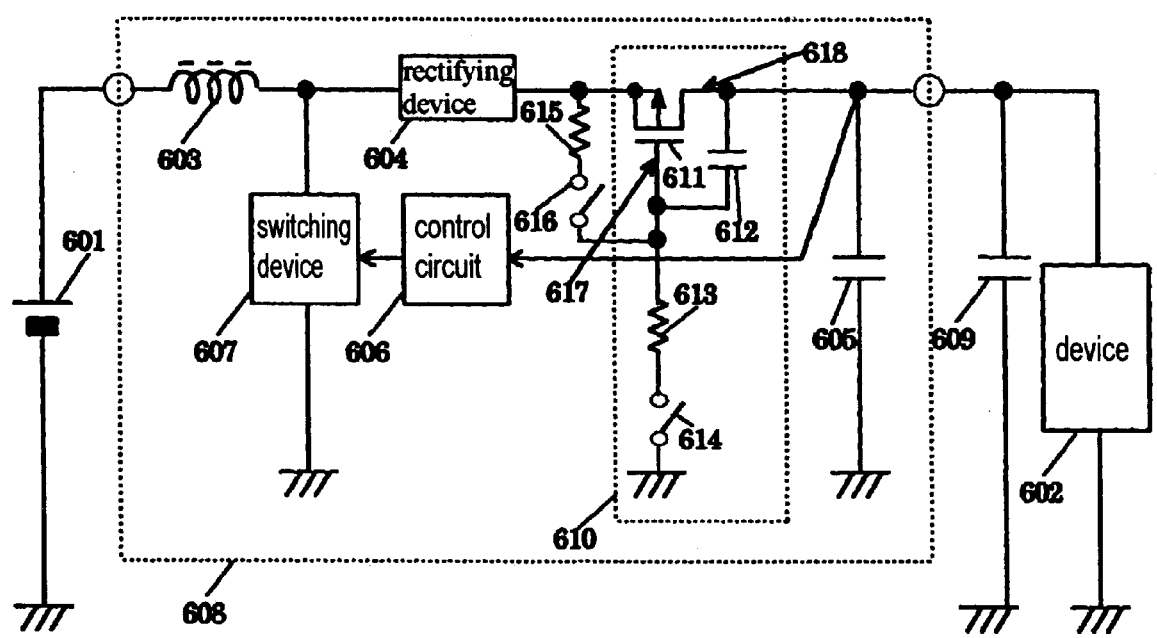
FIG. 6 is a diagram showing a specific circuit example 1 of a chopper type step-up switching regulator with an input/output disconnection switch in accordance with a second embodiment of the present invention.

FIG. 6 is a circuit diagram showing a chopper type step-up switching regulator in accordance with a second embodiment of the present invention. A difference of the second embodiment from the first embodiment resides in that a switch can limit a current flowing for a given period of time. As in the first embodiment, this structure shown in FIG. 6 can limit a rush current flowing from an input power supply 601 to a smoothing capacitor 605 and a capacitor 609 added to a device 602 since the stop of step-up operation when a switch disposed between an input power supply 601 and the device 602 turns off until the start of the step-up operation when the switch turns on.

FIG. 6 shows a specific example of a switch 610 that can limit a current that flows for a given period of time. The switch 610 is made up of a transistor 611, a capacitor 612, a resistor 613, and a switch 614. In the start of the step-up operation when the switch 614 turns on, the same operation as that of an integral amplifying circuit is obtained by addition of the capacitor 612 and the resistor 613 to the transistor 611 so that the switch 614 can be slowly turned on.

A resistor 615 and a switch 616 shown in FIG. 6 are used as an example for turning off the transistor 611 when the step-up operation stops.

When the switch 614 turns on, charges charged in the capacitor 612 are discharged to GND through the resistor 613, and when a gate voltage at which the transistor 611 turns on is set to a threshold value VTH, a gate voltage 617 of the transistor 611 drops to the threshold value to turn on the transistor 611. When the transistor 611 turns on, a drain voltage 618 of the transistor 611 which is an output of the chopper type step-up switching regulator goes up, the capacitor 612 is charged so that the gate voltage 617 of the transistor 611 goes up, and the on-operation of the transistor 611 is suppressed, with the result that an output voltage 618 of the chopper type step-up switching regulator slowly goes up. Assuming that the capacitance of the capacitor 612 is Cc and the discharge current value limited by the resistor 613 is ic, a period of time tc during which the output voltage 618 goes up to the input supply voltage VIN from 0 V is represented by the following expression:

$$tc=Cc \times VIN/ic \qquad (2)$$

Thus, the current limit is realized by setting an output voltage going-up period tc so that the rush current flowing in the capacitor 605 and the capacitor 609 becomes a value producing no problems.

The example in which the transistor 611 is formed of a MOS field effect transistor was described. However, it is apparent that the same is applied if a bipolar transistor is used, and the resistor 613 may be replaced by another element that limits a current. Also, it is apparent that the same effect is obtained if the switch 614 is replaced by a transistor which is an electronic switching device, and the same effect is obtained if the positions of the resistor 613 and of the switch 614 are changed.

Further, it is apparent that the same effect is obtained if a parasitic capacitance existing between a gate 617 and a source 618 of the transistor 611 is employed as the capacitor 612.

Figure 7:
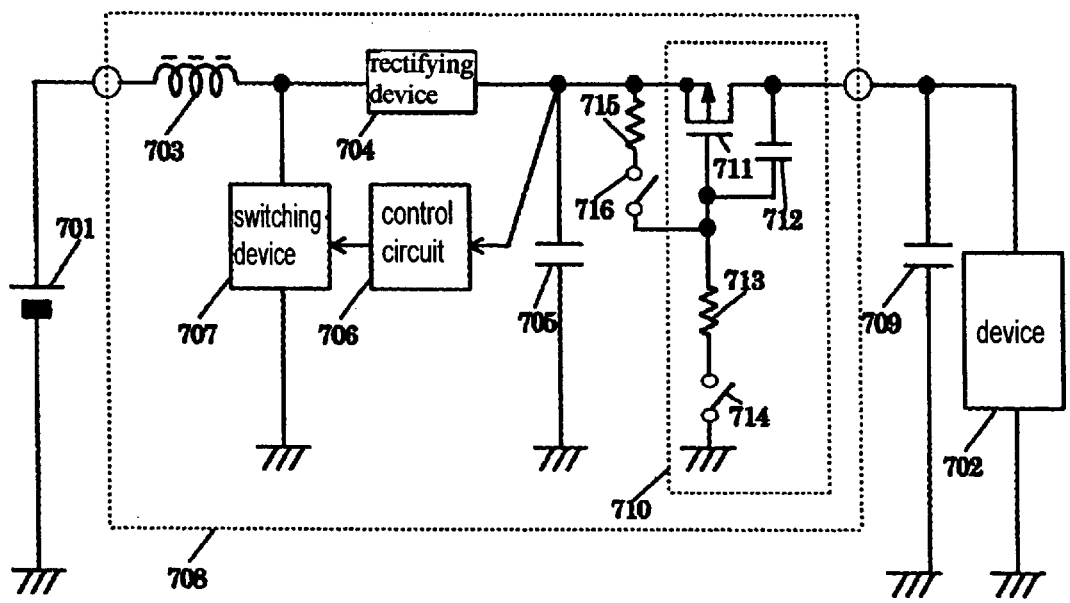
FIG. 7 is a diagram showing a specific circuit example 2 of a chopper type step-up switching regulator with an input/output disconnection switch in accordance with the second embodiment of the present invention.

Also, the same effect can be realized even in a structural example shown in FIG. 7, which is the same as FIG. 6 but has the smoothing capacitor 705 located at the input stage of the switch 710.

Figure 8:
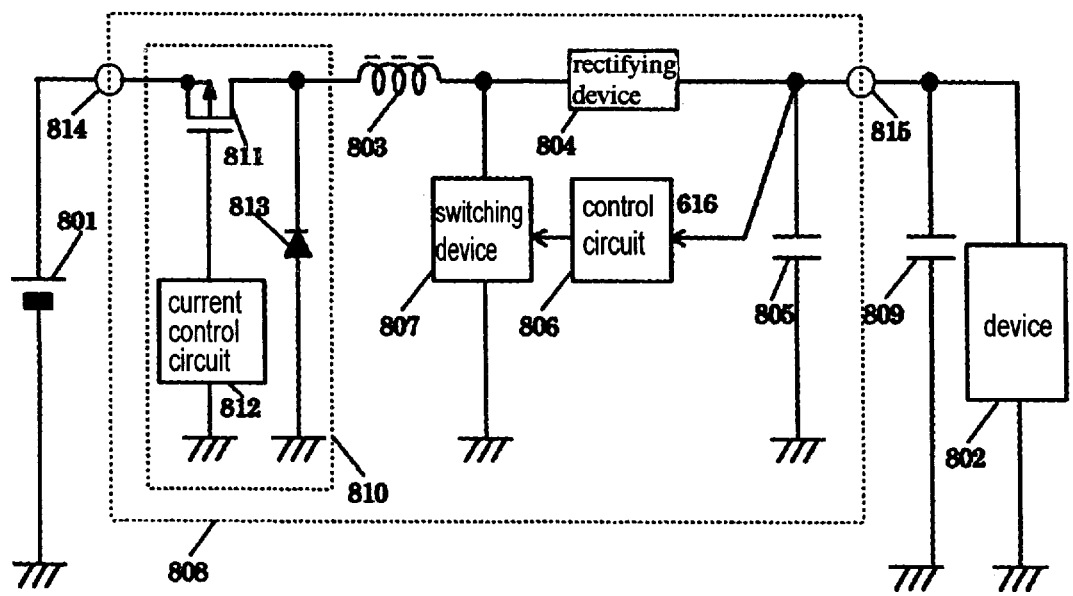
FIG. 8 is a diagram showing a specific circuit example of a chopper type step-up switching regulator with an input/output disconnection switch in accordance with a third embodiment of the present invention.

FIG. 8 is a circuit diagram showing a chopper type step-up switching regulator in accordance with a third embodiment of the present invention. A switch that limits a current is used as in the first embodiment, but a difference of this embodiment from the first embodiment resides in a current limiting method. More specifically, the method is that an inductor 803 disposed between an input power supply 801 and a device 802 is used, and a switching device 811 and a diode 813 are used to control an on/off period of time to limit a rush current flowing into a smoothing capacitor 805 and a capacitor 809 added to the device 802 from the input power supply 801.

Assuming that a period of time after the switch 811 turns on is ton, an inductance of the inductor 803 is L, a voltage of an input power supply 814 is VIN, and a voltage of an output 815 is Vout, a current i flowing into capacitors 805 and 809 from the input power supply 801 which increases with a time t after the switch 811 turns on is represented by the following expression:

$$i=(VIN-Vout)/L \times ton \qquad (3)$$

As is apparent from the above expression (3), the current i can be adjusted by the on-time of the switch 811.

Also, assuming that a period of time after the switch 811 turns off is toff, and a forward voltage drop of the diode 813 is VF, a current −i flowing into the capacitors 805 and 809 from the diode 813 which decreases with a time t after the switch 811 turns off is represented by the following expression:

$$-i=(V\text{out}-VF)/L \times t\text{off} \quad (4)$$

As is apparent from the above expression (4), the current −i can be adjusted by the off-time of the switch 811 similarly.

Accordingly, the current limit can be realized by adjusting the on/off time of the switch 811 by the current control circuit 812 so that the rush current that flows into the capacitor 805 and the capacitor 809 becomes a value producing no problems.

The example in which the transistor 811 is formed of a MOS field effect transistor was described. However, it is apparent that the same is applied if the transistor 811 is replaced by another switching device, and the same effect is obtained if the diode 813 is replaced by another rectifying device.

As was described above, the switching regulator according to the present invention has an advantage that a rush current that flows into a smoothing capacitor and a capacitor added to a device is suppressed when the step-up operation starts from a state in which the step-up operation stops, to thereby prevent an adverse effect that the input supply voltage drops and the rectifying device, the smoothing capacitor and so on are damaged.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A step-up switching regulator, comprising:

input and output terminals;

an input power supply connected to the input terminal;

at least one input/output disconnection switch disposed between the input power supply and a device connected to the output terminal, the input/output disconnection switch being closed at the start of a step-up operation and opened after completion of the step-up operation to disconnect the device from the input power supply and stop the supply of power to the device from the input power supply;

an output capacitor connected to the output terminal; and means for limiting a rush current that flows into the output capacitor from the input power supply when the input/output disconnection switch turns on to start the step-up operation.

2. A step-up switching regulator according to claim 1; wherein the rush current limiting means comprises a current limiting resistor connected to the input/output disconnection switch to set an upper limit on the value of a rush current that can flow through the resistor.

3. A step-up switching regulator according to claim 1; wherein the rush current limiting means further comprises a capacitor connected to a gate of the transistor for controlling the on-time and off-time of the transistor.

4. A step-up switching circuit according to claim 1; wherein the rush current limiting means and the input/output disconnection switch comprise the same transistor, the transistor being connected between the input and output terminals to operate as an integrating amplifier to limit the rush current that flows for a given period of time.

5. A step-up switching regulator according to claim 1; wherein the rush current limiting means and the input/output disconnection switch comprise the same switch connected between the input and output terminals, and a control circuit for controlling an on-time and off-time of the switch to limit a current that is allowed to flow.

6. A step-up switching regulator according to claim 1; further comprising a rectifying device connected between the input and output terminals, and an inductor connected between the input terminal and the rectifying device; wherein the output capacitor is connected between the output terminal and a ground terminal.

7. A step-up switching regulator according to claim 6; wherein the input/output disconnection switch is connected between the inductor and the rectifying device.

8. A step-up switching regulator according to claim 1; wherein the rush current limiting means comprises an integrating amplifier connected between an output of the rectifying device and the output terminal.

9. A step-up switching regulator according to claim 1; wherein the rush current limiting means comprises the parallel connection of a first switch and a series-connected current limiting resistor and second switch, the second switch being closed during a step-up operation so that the current limiting resistor limits current in the regulator, and the first switch being closed after completion of the step-up operation.

10. A step-up switching regulator according to claim 1; wherein the rush current limiting means comprises the series connection of a first switch and a parallel-connected current limiting resistor and second switch, the first switch being closed and the second switch being open during a step-up operation so that the current limiting resistor limits current in the regulator, and the first and second switches being closed after completion of the step-up operation.

11. A step-up switching regulator, comprising: input and output terminals; an input power supply connected to the input terminal; a regulating device connected between the input and output terminals; an output capacitor connected to the output terminal; a transistor connected between the regulating device and the output terminal for limiting a rush current that flows into the output capacitor from the input power supply at the start of a step-up operation; a first resistor and a first switch connected in series between the regulating device and a gate terminal of the transistor; a second resistor and a second switch connected between ground and the gate terminal of the transistor; and a capacitor connected between the output terminal and the gate terminal of the transistor.

* * * * *